United States Patent
Smit et al.

(10) Patent No.: US 11,638,488 B2
(45) Date of Patent: May 2, 2023

(54) CUSHIONING STRUCTURE

(71) Applicants: LOW & BONAR B.V., Arnhem (NL); LOW & BONAR INC., Enka, NC (US)

(72) Inventors: Leendert Smit, Oirsbeek (NL); Rolf-Dieter Böttcher, Kleve (DE); Jeffrey Denton, Canton, NC (US); Jan Mahy, Arnhem (NL)

(73) Assignees: LOW & BONAR B.V., Arnhem (NL); LOW & BONAR INC., Enka, NC (US)

(*) Notice: Subject to any disclaimer, the term of this patent is extended or adjusted under 35 U.S.C. 154(b) by 168 days.

(21) Appl. No.: 16/610,750

(22) PCT Filed: May 8, 2018

(86) PCT No.: PCT/EP2018/061854
§ 371 (c)(1),
(2) Date: Nov. 4, 2019

(87) PCT Pub. No.: WO2018/206568
PCT Pub. Date: Nov. 15, 2018

(65) Prior Publication Data
US 2020/0154902 A1      May 21, 2020

(30) Foreign Application Priority Data
May 9, 2017   (EP) .................................... 17170123

(51) Int. Cl.
*A47C 27/12*      (2006.01)
*A47C 27/00*      (2006.01)
(Continued)

(52) U.S. Cl.
CPC .......... *A47C 27/121* (2013.01); *A47C 27/002* (2013.01); *B68G 7/00* (2013.01);
(Continued)

(58) Field of Classification Search
CPC ..... A47C 27/121; A47C 27/002; A47C 27/00; A47C 27/05; A47C 27/056; A47C 27/15;
(Continued)

(56) References Cited

U.S. PATENT DOCUMENTS 6,272,707 B1   8/2001   Robrecht et al.
9,902,609 B2 * 2/2018   Khambete .............. A47C 27/12
(Continued)

OTHER PUBLICATIONS

"Mat." Merriam-Webster, Merriam-Webster, www.merriam-webster.com/dictionary/mat.*

(Continued)

*Primary Examiner* — David R Hare
*Assistant Examiner* — Madison Emanski
(74) *Attorney, Agent, or Firm* — Oliff PLC

(57) ABSTRACT

A cushioning structure includes a first layer of a three-dimensional structured mat of extruded entangled filaments, the cushioning structure includes a second layer of a three-dimensional structured mat of extruded entangled filaments, and the cushioning structure includes an intermediate layer between the first layer of the three-dimensional structured mat and the second layer of the three-dimensional structured mat.

18 Claims, 2 Drawing Sheets

(51) Int. Cl.
 *B68G 7/00* (2006.01)
 *B68G 11/02* (2006.01)

(52) U.S. Cl.
 CPC .......... *B68G 11/02* (2013.01); *B32B 2250/03* (2013.01); *B32B 2250/24* (2013.01); *B32B 2250/40* (2013.01); *B32B 2262/0207* (2013.01); *B32B 2262/0215* (2013.01); *B32B 2479/00* (2013.01)

(58) Field of Classification Search
 CPC ....... A47C 27/12; A47C 27/14; A47C 27/146; A47C 27/148; A47C 27/16; A47C 21/06; B68G 7/00; B68G 11/02; B32B 2250/24; B32B 2262/0215; B32B 2262/0207; B32B 2250/40; B32B 2250/00; B32B 2250/02; B32B 2250/03; B32B 2479/00; A61F 13/534; A61F 2013/51178; A61F 2013/511; A61F 5/485; A61F 5/48; Y10S 5/923; Y10S 5/00; A47G 9/02
 See application file for complete search history.

(56) References Cited

U.S. PATENT DOCUMENTS

| | | | |
|---|---|---|---|
| 2008/0166532 A1* | 7/2008 | Tsiarkezos | D04B 21/165 112/475.01 |
| 2016/0174725 A1 | 6/2016 | Takaoka | |
| 2016/0263802 A1* | 9/2016 | Takaoka | B29C 48/919 |

OTHER PUBLICATIONS

Jun. 14, 2018 Search Report issued in International Patent Application No. PCT/EP2018/061854.

\* cited by examiner

CUSHIONING STRUCTURE

The invention pertains to cushioning structures.

Cushioning structures for high performance applications, such as for example medical mattresses or high quality mattresses, are generally formed from multiple layers of (different) materials, typically including a layer of springs for providing resilience onto which one or more layers of soft foam, in particular polyurethane foam and/or latex foam, is applied. The layers of foam redistribute the pressure, in particular the pressure component perpendicular to main plane of the cushioning structure (also known as the Z-component), when a person is positioned on the mattress, so that the person on the mattress will not feel the individual springs located underneath the layer of soft foam. Around this structure a breathable, yet liquid impermeable cover is generally applied for sanitary reasons.

However, foams and in particular polyurethane foams have the disadvantage that moisture, such as for example sweat or a spilled liquid, may become entrapped between the person positioned on the cushioning structure and the cushioning structures itself. Generally, closed cell foams are used in cushioning structures.

Therefore, there is a demand for a cushioning structure which prevents, or at least reduces, entrapment of moisture between a person positioned on a cushioning structure and the cushioning structure itself. However, such a cushioning structure should still provide sufficient resilience and support to the person positioned on the cushioning structure.

Furthermore, there is a demand for more sustainable cushioning structures as compared to foams, and in particular polyurethane foams, which are difficult to recycle.

The object of the invention is to provide a cushioning structure which enables to prevent, or at least to reduce, entrapment of moisture between a person positioned on a cushioning structure and the cushioning structure itself and/or a cushioning structure which provides comfort and resilience.

The object is obtained with the cushioning structure according to claim 1.

A cushioning structure is a structure which provides comfort and resilience, in particular in a direction perpendicular to main plane of the cushioning structure (also known as the Z-direction), to one or more body parts of a person in lying or sitting position. Resilience is the ability of a material or a structure to absorb energy when it is deformed elastically (mainly but not exclusively in the Z-direction), and release that energy upon unloading. Comfort in this respect is referred to as spatially resolved (i.e. in X and Y direction) resilience which is such that the local pressure in the Z-direction (the origin of elastic deformation) is redistributed in X and Y in such a way that it is reduced at the area of maximum deformation and transferred to adjacent area through the deformed medium. The energy release upon unloading is time dependent, where slower release tends to be experienced as comfort enhancing. The cushioning effect is usually measured by compressing (in Z-direction) a specified area of the material to a specified indentation level (expressed as percentage of the original thickness), and subsequently measuring the amount of recovery of the compressed area to its original thickness. The durability of the cushioning effect is measured by repeating this indentation in a cyclic way, measuring the recovery reduction over time as a function of the number of cycles. The first layer, the second layer and the intermediate layer provide sufficient resilience to the cushioning structure and the air permeability of the first layer, the second layer and the intermediate layer enable to act as conduct and mixing medium for humid and warm air, which is transported in such a way as to reduce local (body) heat and moisture entrapment.

Preferably, the intermediate layer between the first layer and the second layer is present over the entire extension of the first layer and/or second layer.

In an embodiment, the cushioning structure comprises a first layer and a second layer, wherein the first layer and/or the second layer comprise one or more first zones in X-direction having a residual thickness of at least 70%, preferably at least 80%, more preferably at least 90%, of the initial thickness after 1000, preferably after 5000, more preferably after 10000, even more preferably after 50000 and most preferably after 80000 repeated compression cycles and a residual indentation hardness at 25% compression of at least 70%, preferably at least 80%, more preferably at least 90%, of the initial indentation hardness at 25% compression after 1000, preferably after 5000, more preferably after 10000, even more preferably after 50000 and most preferably after 80000 repeated compression cycles and an air permeability of at least 10 l/(m²·s) at 200 Pa and a pneumatic gradient of 0.5.

The one or more first zones comprised in the first layer and/or second layer of the cushioning structure extend in the plane of the first layer and/or second layer of the cushioning structure (also known as the X-Y plane). The X-dimension of the cushioning material is understood to mean the main dimension of the cushioning structure, generally being the largest dimension of the cushioning structure, also known as the length of the cushioning structure. Generally, the X-direction of the cushioning structure is the direction in which the first layer and/or second layer are produced, which is also known as the production direction or machine direction, or as the direction where a body which lays on the cushioning structure extends in its lengths. The Y-dimension of the cushioning structure is understood to mean the dimension in the plane of the cushioning structure which is perpendicular to the X-dimension of the cushioning structure, generally being the second largest dimension of the cushioning structure, also known as the width of the cushioning structure. The Y-direction of the cushioning structure is the in-plane direction perpendicular to the direction in which the first layer and/or the second layer is produced, which is also known as the cross machine direction.

Preferably, the one or more first zones comprised in the first layer and/or second layer of the cushioning structure extend along the entire width (zoning in X-direction) of the cushioning structure to enabling that the one or more first zones comprised in the first layer and/or second layer of the cushioning structure support those parts of the human body which are prone to develop pressure ulcers, such as for example the sacrum, coccyx, heels or the hips, the elbows, knees, ankles, the back of shoulders, or the back of the cranium.

The one or more first zones comprised in the first layer and/or second layer of the cushioning structure may extend along a certain length (zoning in Y-direction) of the cushioning structure. Preferably, the one or more first zones comprised in the first layer and/or second layer of the cushioning structure are located such that the one or more first zones in Y-direction comprised in the first layer and/or second layer cushioning structure support those parts of the human body which are prone to develop pressure ulcers.

In an alternative embodiment the one or more first zones comprised in the first layer and/or second layer of the cushioning structure extends along the entire length (Y-direction) at the outer ends of the entire width (X-dimension) to ensure that the one or more first zones of the first layer and/or second layer of the cushioning structure support the human body sitting on one edge of the cushioning structure before laying down on the cushioning structure and before staying up from the cushioning structure.

The one or more first zones comprised in the first layer and/or second layer of the cushioning structure may extend through the entire thickness (zoning in Z-direction) of the first layer or second layer of the cushioning structure.

In an alternative embodiment, the one or more first zones comprised in the first layer and/or second layer of the cushioning structure may extend partly through the first layer and/or second layer (Z-dimension) of the cushioning structure, for example the one or more first zones comprised in the first layer and/or second layer of the cushioning structure may extend partly through the first layer and/or second layer of the cushioning structure for about 75% of the thickness, for about 50% of the thickness or for about 25% of the thickness of the first layer and/or second layer of the cushioning structure to optimize the performance, such as for example the comfort, of the cushioning structure.

In a preferred embodiment, the one or more first zones comprised in the first layer and/or second layer of the cushioning structure extends through the first layer and/or second layer of the cushioning structure for about 50% of the thickness of the first layer or second layer of the cushioning structure.

In an embodiment, the cushioning structure comprises a first layer and/or second layer comprising one or more first zones having a residual thickness of at least 70%, preferably at least 80%, more preferably at least 90%, of the initial thickness after 1000, preferably after 5000, more preferably after 10000, even more preferably after 50000 and most preferably after 80000 repeated compression cycles and a residual indentation hardness at 40% compression of at least 70%, preferably at least 80%, more preferably at least 90%, of the initial indentation hardness at 40% compression after 1000, preferably after 5000, more preferably after 10000, even more preferably after 50000 and most preferably after 80000 repeated compression cycles.

In an embodiment, the cushioning structure comprises a first layer and/or second layer comprising one or more first zones having a residual thickness of at least 70%, preferably at least 80%, more preferably at least 90%, of the initial thickness after 1000, or even after 5000, after 10000, after 50000, after 80000, repeated compression cycles and a residual indentation hardness at 65% compression of at least 70%, preferably at least 80%, more preferably at least 90%, of the initial indentation hardness at 65% compression after 1000, preferably after 5000, more preferably after 10000, even more preferably after 50000 and most preferably after 80000 repeated compression cycles.

The indentation hardness at 25%, 40% or 65% compression is determined in accordance with ISO 2439:2008, method B. The initial indentation hardness at 25%, 40% or 65% compression is determined on a cushioning structure or an individual layer (e.g. the first layer, the second layer, the intermediate layer) comprised in the cushioning structure.

Subsequently, the cushioning structure or individual layer comprised in the cushioning structure is subjected to 1000, or even to 5000, to 10000, to 50000, to 80000, repeated compression cycles according to ISO 2439:2008, method E, wherein the sample of the cushioning structure or individual layer comprised in the cushioning structure is compressed to an indentation of 75% of its thickness, i.e. to a thickness of 25% of the initial thickness, at a rate of 100 mm/min. The thickness of the cushioning structure or individual layer comprised in the cushioning structure is determined in accordance with ISO 9864:2014.

After reaching this compression level, the load is released at a rate of 100 mm/min. Between each compression cycle, the cushioning structure or individual layer comprised in the cushioning structure is allowed to rest for 4 minutes before the next compression cycle is started. The residual thickness and the residual indentation hardness after 1000 repeated compression cycles is determined again according to ISO 2439:2008, method B.

In an embodiment, the first layer has an air permeability perpendicular to the plane of the first layer (Z-direction) of at least 10 $l/(m^2 \cdot s)$ at 200 Pa and a pneumatic gradient of 0.5, preferably at least 100 $l/(m^2 \cdot s)$ at 200 Pa and a pneumatic gradient of 0.5, more preferably at least 500 $l/(m^2 \cdot s)$ at 200 Pa and a pneumatic gradient of 0.5, most preferably at least 1000 $l/(m^2 \cdot s)$ at 200 Pa and a pneumatic gradient of 0.5.

The first layer preferably exhibits also air permeability in a direction in the plane (X- and/or Y-direction) of the first layer. Preferably, the first layer has an air permeability in a direction in the plane (X- and/or Y-direction) of the first layer of at least 10 $l/(m^2 \cdot s)$ at 200 Pa and a pneumatic gradient of 0.5, preferably at least 100 $l/(m^2 \cdot s)$ at 200 Pa and a pneumatic gradient of 0.5, more preferably at least 500 $l/(m^2 \cdot s)$ at 200 Pa and a pneumatic gradient of 0.5, most preferably at least 1000 $l/(m^2 \cdot s)$ at 200 Pa and a pneumatic gradient of 0.5.

Preferably, the first layer and/or the second layer and/or the intermediate layer of the cushioning structure are liquid permeable.

In an embodiment, the one or more first zones of the first layer and/or second layer of the cushioning structure have an initial modulus less than 50 kPa, preferably less than 30 kPa, more preferably in the range of 5 to 20 kPa, to ensure that the one or more first zones of the first layer and/or second layer of the cushioning structure are configured to match or approach the initial modulus of subcutaneous fat in a human body. The initial modulus is determined as the compression stress at 2% compression, as determined during compressing of the cushioning structure according to ISO 2439:2008, method B.

In an embodiment, the second layer has an air permeability perpendicular to the plane (Z-direction) of the second layer of at least 10 $l/(m^2 \cdot s)$ at 200 Pa and a pneumatic gradient of 0.5, preferably at least 100 $l/(m^2 \cdot s)$ at 200 Pa and a pneumatic gradient of 0.5, more preferably at least 500 $l/(m^2 \cdot s)$ at 200 Pa and a pneumatic gradient of 0.5, most preferably at least 1000 $l/(m^2 \cdot s)$ at 200 Pa and a pneumatic gradient of 0.5.

The second layer preferably exhibits also air permeability in a direction in the plane (X- and/or Y-direction) of the second layer. Preferably, the second layer has an air permeability in a direction in the plane (X- and/or Y-direction) of the second layer of at least 10 $l/(m^2 \cdot s)$ at 200 Pa and a pneumatic gradient of 0.5, preferably at least 100 $l/(m^2 \cdot s)$ at 200 Pa and a pneumatic gradient of 0.5, more preferably at least 500 $l/(m^2 \cdot s)$ at 200 Pa and a pneumatic gradient of 0.5, most preferably at least 1000 $l/(m^2 \cdot s)$ at 200 Pa and a pneumatic gradient of 0.5.

The intermediate layer of the cushioning structure has an air permeability perpendicular to the plane (Z-direction) of the intermediate layer of at least 10 $l/(m^2 \cdot s)$ at 200 Pa and a pneumatic gradient of 0.5, preferably at least 100 $l/(m^2 \cdot s)$ at 200 Pa and a pneumatic gradient of 0.5, more preferably at least 500 l/(m²·s) at 200 Pa and a pneumatic gradient of 0.5, most preferably at least 1000 l/(m²·s) at 200 Pa and a pneumatic gradient of 0.5.

The air permeability of the first layer, of the second layer and of the intermediate layer of the cushioning structure is determined in accordance to DIN 53887 dated August 1986 with a measuring area of 20 cm². For clarity is noted that the air permeability of the first layer, of the second layer and of the intermediate layer of the cushioning structure is normally determined in uncompressed state. For the determination of the air permeability in a direction in the plane (X- and/or Y-direction) of the first layer and the second layer comprised in the cushioning structure, a section of the first layer or the second layer is used having a length of 50 mm.

However, even in a compressed state the cushioning structure enables to remove, or at least reduce, entrapment of moisture between a person positioned on a cushioning structure and the cushioning structure itself.

In a preferred embodiment, the first layer being compressed to 50% of its initial thickness has an air permeability perpendicular to the plane (Z-direction) of the first layer of at least 10 l/(m²·s) at 200 Pa and a pneumatic gradient of 0.5, preferably at least 100 l/(m²·s) at 200 Pa and a pneumatic gradient of 0.5, more preferably at least 500 l/(m²·s) at 200 Pa and a pneumatic gradient of 0.5, most preferably at least 1000 l/(m²·s) at 200 Pa and a pneumatic gradient of 0.5.

In a preferred embodiment, the first layer being compressed to 50% of its initial thickness exhibits an air permeability in a direction in the plane (X- and/or Y-direction) of the first layer of at least 10 l/(m²·s) at 200 Pa and a pneumatic gradient of 0.5, preferably at least 100 l/(m²·s) at 200 Pa and a pneumatic gradient of 0.5, more preferably at least 500 l/(m²·s) at 200 Pa and a pneumatic gradient of 0.5, most preferably at least 1000 l/(m²·s) at 200 Pa and a pneumatic gradient of 0.5.

In a preferred embodiment, the second layer being compressed to 50% of its initial thickness has an air permeability perpendicular to the plane (Z-direction) of the second layer of at least 10 l/m²·s at 200 Pa and a pneumatic gradient of 0.5, preferably at least 100 l/(m²·s) at 200 Pa and a pneumatic gradient of 0.5, more preferably at least 500 l/(m²·s) at 200 Pa and a pneumatic gradient of 0.5, most preferably at least 1000 l/(m²·s) at 200 Pa and a pneumatic gradient of 0.5.

In a preferred embodiment, the second layer being compressed to 50% of its initial thickness exhibits an air permeability in a direction in the plane (X- and/or Y-direction) of the second layer of at least 10 l/(m²·s) at 200 Pa and a pneumatic gradient of 0.5, preferably at least 100 l/(m²·s) at 200 Pa and a pneumatic gradient of 0.5, more preferably at least 500 l/(m²·s) at 200 Pa and a pneumatic gradient of 0.5, most preferably at least 1000 l/(m²·s) at 200 Pa and a pneumatic gradient of 0.5.

The second layer of the cushioning structure may have a pressure redistribution capability, in particular the pressure component perpendicular (Z-direction) to plane of the cushioning structure.

The pressure redistribution capability of the second layer is determined by placing the first layer on a mat with the intermediate layer on top of the first layer, the mat comprising multiple pressure sensors distributed over its surface and recording the pressure distribution when a human body or a body simulating a human body is placed on top of the intermediate layer. The human body or a body simulating a human body is removed from the intermediate layer, the second layer is placed on top of the intermediate layer, and recording the pressure distribution when the human body or the body simulating a human body is placed on top of the second layer. The pressure redistribution capability of the second layer can be obtained by comparing both recorded pressure distributions. Preferably, the multiple pressure sensors are placed in parallel rows, the rows of sensors preferably being spaced at a distance of 5 cm. Preferably, the distance between the pressure sensors within a row of pressure sensors equals the distance between the rows of pressure sensors.

Preferably, the pressure redistribution capability of the second layer reduces the maximum recorded pressure by at least 25%, more preferably by at least 40%, even more preferably by at least 50%, most preferably by at least 60%.

Preferably, the second layer of the cushioning structure is located, when in use, closer to the human body positioned on the cushioning structure than the first layer and the intermediate layer. The pressure redistribution capability of the second layer provides comfort to the person positioned on the cushioning structure as the person positioned on the cushioning structure will be less aware of presence of the first layer.

The intermediate layer of the cushioning structure may have a pressure redistribution capability, in particular the pressure component perpendicular (Z-direction) to plane of the cushioning structure.

The pressure redistribution capability of the intermediate layer is determined by placing the first layer on a mat comprising multiple pressure sensors distributed over its surface and recording the pressure distribution when a human body or a body simulating a human body is placed on top of the first layer. The human body or a body simulating a human body is removed from the first layer, the intermediate layer is placed on top of the first layer, and recording the pressure distribution when the human body or the body simulating a human body is placed on top of the intermediate layer. The pressure redistribution capability of the intermediate layer can be obtained by comparing both recorded pressure distributions. Preferably, the multiple pressure sensors are placed in parallel rows, the rows of sensors preferably being spaced at a distance of 5 cm. Preferably, the distance between the pressure sensors within a row of pressure sensors equals the distance between the rows of pressure sensors.

Preferably, the pressure redistribution capability of the intermediate layer reduces the maximum recorded pressure by at least 25%, more preferably by at least 40%, even more preferably by at least 50%, most preferably by at least 60%.

Preferably, the intermediate layer of the cushioning structure is located, when in use, closer to the human body positioned on the cushioning structure than the first layer. The pressure redistribution capability of the intermediate layer provides comfort to the person positioned on the cushioning structure as the person positioned on the cushioning structure will be less aware of presence of the first layer.

The first layer of the cushioning structure may also have a pressure redistribution capability, in particular the pressure component perpendicular to plane (Z-direction) of the cushioning structure, when at least one further layer is comprised in the cushioning structure. The at least one further layer is preferably located, when in use, below the first layer of the cushioning structure.

The pressure redistribution capability of the first layer is determined by placing the at least one further layer on a mat comprising multiple pressure sensors distributed over its surface and recording the pressure distribution when a human body or a body simulating a human body is placed on top of the at least one further layer. The human body or a body simulating a human body is removed from the at least one further layer, the first layer is placed on top of the at least one further layer, and recording the pressure distribution when the human body or the body simulating a human body is placed on top of the first layer. The pressure redistribution capability of the first layer can be obtained by comparing both recorded pressure distributions. Preferably, the multiple pressure sensors are placed in parallel rows, the rows of sensors preferably being spaced at a distance of 5 cm. Preferably, the distance between the pressure sensors within a row of pressure sensors equals the distance between the rows of pressure sensors.

Preferably, the pressure redistribution capability of the first layer reduces the maximum recorded pressure by at least 25%, more preferably by at least 40%, even more preferably by at least 50%, most preferably by at least 60%.

In a preferred embodiment, the first layer and/or the second layer of the cushioning structure are three-dimensional structured mats of extruded entangled filaments.

In another preferred embodiment, the cushioning structure comprises an intermediate layer which is selected from the group comprising a woven, a spunbonded or spun laid nonwoven, a melt blown nonwoven, a carded nonwoven, an air laid nonwoven, a wet laid nonwoven, a knitted fabric, a net, a scrim and a two-dimensional mat of extruded entangled filaments.

In another embodiment, the one or more first zones of the first layer and/or second layer of the cushioning structure comprise a three-dimensional structured mat of extruded entangled filaments. Preferably, the filaments of the three-dimensional structured mat of extruded entangled filaments are extruded polymeric filaments. A three-dimensional structured mat of extruded entangled filaments may be provided by any suitable process. Preferably, the three-dimensional structured mat of extruded entangled filaments is provided by extruding polymeric filaments and collecting the extruded filaments into a three-dimensional structure by allowing the filaments to bend, to entangle and to come into contact with each other, preferably in a still molten state. Bending and entangling of the extruded filaments are preferably initiated by collecting the filaments onto a profiled surface, which defines the structure of the three-dimensional structured mat of extruded entangled filaments. Preferably, the surface on which the filaments are collected is profiled such that the three-dimensional structured mat of filaments is shaped into a three-dimensional form which comprises hills and valleys, hemispheres, positive and/or negative cuspates, cups and/or waffles, pyramids, U-grooves, V-grooves, cones and/or cylinders capped with a hemisphere.

In another embodiment, the one or more first zones of the first layer and/or second layer comprise different three dimensional forms in different zones. As an example, a first zone of the one or more first zones comprises hills and valleys and a second zone of the one or more first zones comprises positive and/or negative cuspates.

In another embodiment the one or more first zones of the first layer and/or second layer comprise different sizes of the three dimensional forms in different zones perpendicular to the plane (extension in Z-dimension). As an example, a first zone of the one or more first zones comprises 75% of the thickness of the entire first layer and/or second layer and a second zone of the one or more first zones comprise 50% of the thickness of the first layer and/or second layer.

In another embodiment the one or more first zones of the first layer and/or second layer comprise different sizes in different zones in the plane of the first layer (X- and/or Y-direction). As an example, a first zone of the one or more first zones comprises a 1.5 time of the length (X-direction) of a second zone of the one or more first zones. Another example is that a first zone of the one or more first zones comprises 0.8 time of the width (Y-direction) of a second zone of the one or more first zones. Even a combination of different length (X-direction) and different width (Y-direction) between different zones of the one or more first zones is possible.

The three-dimensional structured mat of extruded entangled filaments may be shaped in any desired three-dimensional form, such as for example in a series of hills and valleys either being spaced apart by a specified distance or abutted to each other and either being placed in parallel lines or in a staggered formation, or in a series of hemispheres either being spaced apart by a specified distance or abutted to each other and either being placed in parallel lines or in a staggered formation. The three-dimensional structured mat of extruded entangled filaments may comprise positive and/or negative cuspates, cups or waffles either being spaced apart by a specified distance or abutted to each other and either being placed in parallel lines or in a staggered formation. Alternatively, the three-dimensional structured mat of extruded entangled filaments may comprise a series of pyramids, either being spaced apart by a specified distance or abutted to each other and either being placed in parallel lines or in a staggered formation. The three-dimensional structured mat of extruded entangled filaments may comprise U- and/or V-grooves, preferably extending in machine direction and/or cross machine direction. The three-dimensional structured mat of extruded entangled filaments may comprise a series of cylinders capped with a hemisphere, either being spaced apart by a specified distance or abutted to each other and either being placed in parallel lines or in a staggered formation. The three-dimensional structured mat of extruded entangled filaments may also comprise any combination of hills and valleys, hemispheres, positive and/or negative cuspates, cups or waffles, pyramids, cones, cylinders capped with a hemisphere, U-grooves, and/or V-grooves.

Preferably, the three-dimensional structured mat of extruded entangled filaments is constructed such that the three-dimensional structured mat of extruded entangled filaments has two main surfaces, defined by the length and width of the cushioning structure, the two main surfaces being oriented plane parallel to each other. When the three-dimensional structured mat of extruded entangled filaments comprises a series of hills and valleys, the tops of the hills are located in the plane of the first main surface and the bases of the valleys are located in the plane of the second main surface. When the three-dimensional structured mat of extruded entangled filaments comprises a series of hemispheres, the tops of the hemispheres are located in the plane of the first main surface and the base surfaces of the hemispheres are located in the plane of the second main surface. When the three-dimensional structured mat of extruded entangled filaments comprises a series of pyramids, the tops of the pyramids are located in the plane of the first main surface and the base surfaces of the pyramids are located in the plane of the second main surface. When the three-dimensional structured mat of extruded entangled filaments comprises a U-grooves and/or V-grooves, the tops of the U-grooves and/or V-grooves are located in the plane of the first main surface and the base surfaces of the U-grooves and/or V-grooves are located in the plane of the second main surface. When the three-dimensional structured mat of extruded entangled filaments comprises a cuspates, cups and/or waffles, the tops of the cuspates, cups or waffles are located in the plane of the first main surface and the base surfaces of the cuspates, cups or waffles are located in the plane of the second main surface. When the three-dimensional structured mat of extruded entangled filaments comprises cylinders capped with a hemisphere the tops of the hemispheres are located in the plane of the first main surface and the base of the cylinders are located in the plane of the second main surface.

Preferably, the one or more first zones of the first layer and/or second layer cushioning structure comprise a three-dimensional structured mat of extruded entangled filaments.

The diameter of the extruded entangled filaments in the three-dimensional structured mat of extruded entangled filaments may be varied widely. Preferably, the extruded entangled filaments in the three-dimensional structured mat of extruded entangled filaments have an average diameter in the range of 100 μm to 2000 μm, more preferably in the range of 200 μm to 1500 μm, even more preferably in the range of 300 μm to 1100 μm, most preferably in the range of 500 μm to 900 μm.

Preferably, the filaments of the three-dimensional structured mat of extruded entangled filaments are thermally bonded at their crossing points, thus forming an entangled structure of extruded filaments shaped in three dimensions. Most preferably, the filaments of the three-dimensional structured mat of extruded entangled filaments are still in their molten state when collected on the profiled surface to form a partly interpenetrated melt-bonding at their entanglements. By further solidification of the entangled filaments over a profiled surface, a three-dimensional netting structure of extruded entangled filaments is formed, which is consolidated in X, Y and Z-direction.

The extruded entangled filaments of the three-dimensional structured mat of extruded entangled filaments of the first layer, the second layer and/or of the intermediate layer may be composed of any suitable polymer or blend of polymers.

In an embodiment, the first layer and/or the second layer and/or the intermediate layer of the cushioning structure comprises a thermoplastic elastomeric polymer or low-density polyethylene (LDPE), linear low-density polyethylene (LLDPE), very-low-density polyethylene (VLDPE) and metallocene polymerized plastomers. The thermoplastic elastomeric polymer is preferably selected from thermoplastic polyolefin elastomeric polymers (TPO), such as for example thermoplastic polypropylene elastomeric polymer, thermoplastic vulcanisates (TPV), thermoplastic polyester elastomeric polymers (TPE-E or CoPET), thermoplastic styrenic elastomeric polymers (TPS, including styrene-butadiene copolymers, SBC), thermoplastic polyamides (TPA), or thermoplastic elastomeric polyurethane polymers (TPU).

The first layer, the second layer and/or the intermediate layer of the cushioning structure preferably consists for at least 50 wt. %, preferably for at least 75 wt. %, more preferably for at least 90 wt. %, most preferably for at least 95 wt. % of a polymer.

The filaments of the intermediate layer can be monocomponent filaments as well as bicomponent filaments, wherein the bicomponent filaments may be of a side-by-side model, concentric or eccentric core/sheath model or island-in-the-sea model.

In a preferred embodiment, the filaments of the intermediate layer are bicomponent filaments of the core/sheath model, wherein the sheath and the core can be composed of two polymers which can have the same chemical structure or the sheath and the core can be composed of different polymers of different chemical structures.

For the core and the sheath, any suitable polymer can be used, as long as the sheath polymer has a melting temperature which is lower than the melting temperature of the core polymer.

In a preferred embodiment, the intermediate layer is a nonwoven comprising bicomponent filaments and the filaments of the nonwoven may be thermally bonded. Preferably, the melting temperature of the sheath polymer is lower or at least equal to the melting temperatures of any other polymer used in the cushioning structure.

In another preferred embodiment, the intermediate layer is a two-dimensional mat of extruded entangled filaments, wherein the filaments preferably are extruded mono-component filaments. The two-dimensional mat of extruded entangled filaments may be provided by any suitable process. Preferably, the two-dimensional structured mat of extruded entangled filaments is provided by extruding polymeric filaments and collecting the extruded filaments onto a two-dimensional flat surface by allowing the filaments to bend, to entangle and to come into contact with each other, preferably in a still molten state. Bending and entangling of the extruded filaments are preferably initiated by collecting the filaments onto a flat surface, which defines the flat structure of the two-dimensional mat of extruded entangled filaments.

The filaments of the two-dimensional mat of extruded entangled filaments may comprise a thermoplastic elastomeric polymer or low-density polyethylene (LDPE), linear low-density polyethylene (LLDPE), very-low-density polyethylene (VLDPE) and metallocene polymerized plastomers. The thermoplastic elastomeric polymer is preferably selected from thermoplastic polyolefin elastomeric polymers (TPO), such as for example thermoplastic polypropylene elastomeric polymer, thermoplastic vulcanisates (TPV), thermoplastic polyester elastomeric polymers (TPE-E or CoPET), thermoplastic styrenic elastomeric polymers (TPS, including styrene-butadiene copolymers, SBC), thermoplastic polyamides (TPA), or thermoplastic elastomeric polyurethane polymers (TPU).

In another embodiment, the first layer and/or the second layer and/or the intermediate layer comprise a polymer selected from a group comprising thermoplastic elastomeric polymers such as for example thermoplastic polypropylene elastomeric polymer, thermoplastic vulcanisates (TPV), thermoplastic polyester elastomeric polymers (TPE-E or CoPET), thermoplastic styrenic elastomeric polymers (TPS, including styrene-butadiene copolymers, SBC), thermoplastic polyamides (TPA), or thermoplastic elastomeric polyurethane polymers (TPU) and low-density polyethylene (LDPE), linear low-density polyethylene (LLDPE), very-low-density polyethylene (VLDPE) and metallocene polymerized plastomers.

In a preferred embodiment the first layer and/or the second layer and/or the intermediate layer comprise the same polymer for easier and economical production of the cushioning structure and for easier recycling of the cushioning structure.

In an embodiment, the first layer and/or the second layer of the cushioning structure comprises one or more first zones have an initial modulus less than 50 kPa, preferably less than 30 kPa, more preferably in the range of 5 to 20 kPa, and one or more second zones having an initial modulus which is higher than the initial modulus of the one or more first zones, preferably at least 20 kPa, more preferably at least 30 kPa, even more preferably at least 50 kPa to enable the cushioning structure to aid in preventing the occurrence of pressure ulcers in a human body.

In an embodiment, the first layer and/or the second layer of the cushioning structure comprises one or more first zones having a first indentation hardness at 25% compression and one or more second zones having a second indentation hardness at 25% compression which is higher than the indentation hardness at 25% compression of the one or more first zones. Preferably, the ratio of the second indentation hardness at 25% compression of the one or more second zones over the first indentation hardness at 25% compression of the one or more first zones of the first layer and/or the second layer of the cushioning structure is in the range of 1.5 to 5, more preferably in the range of 1.6 to 4, most preferably in the range of 1.75 to 3.

Preferably, the cushioning structure is configured such that the one or more first zones comprised in the first layer and/or in the second layer of the cushioning structure support those parts of the human body which are prone to develop pressure ulcers, such as for example the sacrum, coccyx, heels or the hips, the elbows, knees, ankles, the back of shoulders, or the back of the cranium.

In an embodiment, the first layer and/or the second layer of the cushioning structure comprises one or more first zones having a first indentation hardness at 40% compression and one or more second zones having a second indentation hardness at 40% compression which is higher than the indentation hardness at 40% compression of the one or more first zones. Preferably, the ratio of the second indentation hardness at 40% compression of the one or more second zones over the first indentation hardness at 40% compression of the one or more first zones of the first layer and/or second layer of the cushioning structure is in the range of 1.5 to 5, more preferably in the range of 1.6 to 4, most preferably in the range of 1.75 to 3.

In an embodiment, the first layer and/or the second layer of the cushioning structure comprises one or more first zones having a first indentation hardness at 65% compression and one or more second zones having a second indentation hardness at 65% compression which is higher than the indentation hardness at 65% compression of the one or more first zones. Preferably, the ratio of the second indentation hardness at 65% compression of the one or more second zones over the first indentation hardness at 65% compression of the one or more first zones of first layer and/or the second layer of the cushioning structure is in the range of 1.5 to 5, more preferably in the range of 1.6 to 4, most preferably in the range of 1.75 to 3.

The higher indentation hardness at 25%, 40% and/or 65% compression of the one or more second zones of the first layer and/or the second layer of the cushioning structure may be obtained by increasing the number of filaments per unit of volume in the one or more second zones of the first layer and/or the second layer as compared to the number of filaments per unit of volume in the one or more first zones of the first layer and/or the second layer of the cushioning structure. Preferably, the number of filaments per unit of volume in the one or more second zones of the first layer and/or the second layer is at least 10% higher, more preferably at least 20% higher, more preferably at least 30% higher, most preferably at least 40% higher, than the number of filaments per unit of volume in the one or more first zones of the first layer and/or the second layer.

The higher indentation hardness at 25%, 40% and/or 65% compression of the one or more second zones of the first layer and/or the second layer of the cushioning structure may also be obtained by increasing the diameter of filaments in the one or more second zones of the first layer and/or the second layer as compared to the diameter of filaments in the one or more first zones of the first layer and/or the second layer of the cushioning structure. Preferably, the diameter of the filaments in the one or more second zones of the first layer and/or the second layer is at least 10% higher, more preferably at least 20% higher, more preferably at least 30% higher, most preferably at least 40% higher, than the diameter of the filaments in the one or more first zones of the first layer and/or the second layer.

The higher indentation hardness at 25%, 40% and/or 65% compression of the one or more second zones of the first layer and/or the second layer of the cushioning structure may also be obtained by varying the polymer type comprised in the filaments in the one or more second zones of the first layer and/or the second layer as compared to the polymer type comprised in the filaments in the one or more first zones of the first layer and/or the second layer of the cushioning structure.

In a preferred embodiment, the one or more first zones of the first layer and/or the second layer as well as the one or more second zones of the first layer and/or the second layer comprise a three-dimensional structured mat of extruded entangled filaments. The higher initial modulus of the one or more second zones of the first layer and/or the second layer of the cushioning structure may be obtained by selecting a different three-dimensional form for the three-dimensional structured mat of extruded entangled filaments comprised in the one or more second zones of the first layer and/or the second layer of the cushioning structure as compared to the three-dimensional shape for the three-dimensional structured mat of extruded entangled filaments comprised in the one or more first zones of the first layer and/or the second layer of the cushioning structure.

The three-dimensional structured mat of extruded entangled filaments may be shaped independently in any desired three-dimensional form for the one or more second zones of the first layer and/or the second layer and for the one or more first zones of the first layer and/or the second layer, such as for example in a series of hills and valleys either being spaced apart by a specified distance or abutted to each other and either being placed in parallel lines or in a staggered formation, or in a series of hemispheres either being spaced apart by a specified distance or abutted to each other and either being placed in parallel lines or in a staggered formation. The three-dimensional structured mat of extruded entangled filaments may comprise positive and/or negative cuspates, cups or waffles either being spaced apart by a specified distance or abutted to each other and either being placed in parallel lines or in a staggered formation. Alternatively, the three-dimensional structured mat of extruded entangled filaments may comprise a series of pyramids, either being spaced apart by a specified distance or abutted to each other and either being placed in parallel lines or in a staggered formation. The three-dimensional structured mat of extruded entangled filaments may comprise U-grooves and/or V-grooves, preferably extending in machine direction and/or cross machine direction. The three-dimensional structured mat of extruded entangled filaments may comprise a series of cylinders capped with a hemisphere, either being spaced apart by a specified distance or abutted to each other and either being placed in parallel lines or in a staggered formation. The three-dimensional structured mat of extruded entangled filaments may also comprise any combination of hills and valleys, hemispheres, positive and/or negative cuspates, cups or waffles, pyramids, cylinders capped with a hemisphere, cones, U-grooves and/or V-grooves.

Preferably, the first layer and/or second layer comprised in the cushioning structure comprise a three-dimensional structured mat of extruded entangled filaments which has a thickness in the range of 5 to 100 mm, preferably 5 to 50 mm, determined in accordance with ISO 9864:2014.

Preferably, the first layer and/or the second layer comprised in the cushioning structure comprise a three-dimensional structured mat of extruded entangled filaments having a weight in thickness in the range of 100 to 1500 g/m², preferably 250 to 1000 g/m², more preferably 400 to 800 g/m², determined in accordance EN 965-1995 as the average of 10 samples of 100 cm².

In an embodiment, the three-dimensional structured mat of extruded entangled filaments has an open area of at least 75 vol. % (i.e. at maximum 25 vol. % is occupied by the extruded entangled filaments), preferably at least 90 vol. %, more preferably at least 95 vol. % to obtain a lightweight cushioning structure having a high air permeability.

In an embodiment, the first layer and/or the second layer of the cushioning structure comprises a three-dimensional (3D) printed structure. The three-dimensional printing process enables that a three-dimensional printed structure can be provided in a particular pattern in one or more first zones of the product, by different internal geometries for at least two first zones of the product and/or by applying two different materials. A fill pattern is the 'internal geometry' created within a three-dimensional printed structure by the "filling in" (printing) of the area inside the outer margins of a 2D layer slice. The properties of a single material can be altered by introducing variations in the pattern of the deposition path of an extrusion head as it forms layers of material on a work surface. Other techniques could also be employed, such as using overlapping loop-depositing paths (rather than straight lines) by varying both the tool head path and its deposition settings, as can be induced by phenomena such as viscous thread instability. These techniques enable the deposition of coiled paths of varying coil shape, size, and lateral and vertical overlap, creating various desired mechanical properties by a combination of several factors including density and number of node connections between loops. Techniques using non-looped strands or strands of varying shapes, thicknesses, and patterns can also be used. Similarly, honeycomb or similar grid-like patterns can be created with one or more materials using a variety of well-known three-dimensional printing technologies.

In an embodiment, the intermediate layer prevents that the specific shapes in which the three-dimensional structured mat of extruded entangled filaments or a three-dimensional printed material comprised in the first layer is formed nest themselves in the specific shapes in which the three-dimensional structured mat of extruded entangled filaments or a three-dimensional printed material comprised in the second layer is formed.

Preferably, the intermediate layer prevents or at least reduces a deformation of the first layer and/or the second layer in X-direction and in Y-direction.

The intermediate layer may also provide increased shear resistance to the three-dimensional structured mat of extruded entangled filaments comprised in the first layer and/or second layer of the cushioning structure.

In a preferred embodiment, the first layer, the second layer and the intermediate layer are bonded to each other by any suitable process at their main surfaces. Typically, mechanical bonding by needling and/or stitching, chemical bonding by additional adhesive or thermal bonding by heat application, e.g. by hot air or ultrasonic, are possible. Preferably, the bonding between the first layer, the second layer and the intermediate layer is provided by thermal bonding. Preferably, the bonding between the first layer, the second layer and the intermediate layer is provided by thermal bonding of the sheath polymer of the bicomponent filaments of the nonwoven of the intermediate layer.

The occurrence of pressure ulcers is a growing issue in hospitals and, even more so, in facilities for extended care, elderly care, etc. Therefore, there is a need to provide materials and or structures that can help preventing the onset of pressure ulcers in patients that must lie down or sit, for example on a cushioning structure of a wheel chair, for extended periods of time.

The market for decubitus prevention devices showcases a variety of product solutions aimed to reduce the chance of pressure ulcers developing. For the clear majority of these devices pressure redistribution (or erroneously called pressure reduction) is the core design principle. Yet in recent years it has been shown that, in addition to the absolute local pressure, also the occurrence of shear forces and the conditions of the local microclimate is of importance.

Pressure ulcers, also known as pressure sores, bedsores or decubitus ulcers, are localized injuries to the skin and/or the underlying tissue that usually occur over a bony prominence because of pressure, or pressure in combination with shear and/or friction. The most common locations in the human body where pressure ulcers develop are the skin overlying the sacrum, coccyx, heels or the hips, but other locations in the human body such as the elbows, knees, ankles, back of the shoulders or the back of the cranium can be affected. The commonality here is that the pressure ulcers primarily occur over a bony prominence which basically means that these are parts on the human body where is an absence or only a limited presence of subcutaneous fat.

Pressure ulcers occur due to pressure applied to soft tissue of the human body resulting in completely or partially obstructed blood flow to the soft tissue. Shear forces are also a cause, as the shear forces apply a stress on blood vessels that supply blood flow to the skin. Pressure ulcers most commonly develop in individuals who are not moving about, such as for example those individuals being bedridden or confined to a wheelchair. It is widely believed that other factors can influence the tolerance of skin for pressure and shear forces, thereby increasing the risk of pressure ulcer development in the human body. These factors include protein-calorie malnutrition, for example a lack of proteins or a lack/abundance of calories, an unfavorable microclimate on the human skin, for example skin wetness caused by sweating or incontinence, diseases that reduce blood flow to the skin, such as for example arteriosclerosis, or diseases that reduce the sensation in the skin, such as for example paralysis or neuropathy.

The importance of the micro-climate on the human skin is twofold. If the temperature at the human skin is elevated, then the onset of pressure ulcers will be facilitated. Basically, with increasing temperature, the metabolism in the cells of the human skin increases and therefore the need for nutrients in the cell is higher. In particular, when the elevated temperature at the human skin occurs in combination with elevated pressure and related obstructed blood flow to the human skin, the cells of the human skin become starved and die.

In addition to the higher temperature at the human skin, people will sweat and the local humidity at the human skin rises. A high humidity has a strong effect on the friction coefficient of the human skin, thus increasing the chance on local friction wounds in the top-layer of the human skin that will then act as the start of a pressure ulcer.

The cushioning structure comprising an air permeable first layer, an air permeable second layer and an air permeable intermediate layer enables to remove, or at least reduce, entrapment of moisture between a person positioned on a cushioning structure and the cushioning structure itself. When the surface, which is in contact with the person positioned on the cushioning structure when in use, is air permeable the moisture can be removed by drainage and/or ventilation through the air permeable first layer, second layer and/or air permeable the intermediate layer of the cushioning structure. When the cushioning structure is enclosed in a liquid impermeable cover, the air permeable first layer, second layer and/or air permeable the intermediate layer of the cushioning structure would still allow improved cooling of the human body positioned on the liquid impermeable cover of the cushioning structure, which reduces the amount of sweat exerted by the human body.

U.S. Pat. No. 6,272,707 B1 discloses a support pad including a single layer of an air and liquid permeable three dimensional matrix of nylon material or polyester material. Although the support pad of U.S. Pat. No. 6,272,707 B1 may be used as a cushioning structure, it does not always provide sufficient comfort to the person positioned on the cushioning structure.

US 2016/0174725 A1 discloses a hygienic cushion comprising a core of a three-dimensional net-like structure. The three-dimensional random mat of entangled filaments is provided by providing filaments and collecting the filaments into a three-dimensional structure by allowing the filaments to bend and to come into contact with each other, preferably in a molten state. Bending of the filaments can for example be initiated by collecting the filaments into a water bath. U.S. Pat. No. 5,639,543 A discloses an example of such a three-dimensional random mat of entangled filaments. The bending of the filaments is random and does not result in an array of particular three-dimensional form.

In an embodiment, the cushioning structure comprises one or more further layers may be provided by any suitable material, as long as the one or more further layers of the cushioning structure having an air permeability of at least 10 l/(m²·s) at 200 Pa and a pneumatic gradient of 0.5.

The one or more further layers of the cushioning structure may comprise a V-lapped nonwoven, an air laid nonwoven, a spunbonded or spun laid nonwoven, a meltblown nonwoven, a carded nonwoven, a three-dimensional woven fabric, a three-dimensional knitted fabric, a three-dimensional random mat of entangled filaments, a three-dimensional structured mat of extruded entangled filaments, a 3D-printed material, a honeycomb structure, and or a relaxed honeycomb structure.

In a preferred embodiment, the cushioning structure does not comprise a foam.

The one or more further layers preferably have an air permeability equal or higher than the air permeability of the first layer and/or second layer and/or intermediate layer of the cushioning structure.

The cushioning structure be any surface based on compressible material which contacts the human body for an extended duration of time while, standing, seating, lying down or during physical activity.

In an embodiment, the one or more further layers of the cushioning structure comprise a three-dimensional woven fabric. Three-dimensional woven fabrics are known to the skilled person.

In another embodiment, the one or more further layers of the cushioning structure comprise a three-dimensional knitted fabric. Three-dimensional knitted fabrics are known to the skilled person.

In another embodiment, the one or more further layers of the cushioning structure comprise a V-lapped nonwoven. V-lapped nonwovens are known to the skilled person.

In another embodiment, the one or more further layers of the cushioning structure comprise a honeycomb structure. The honeycomb structures may be provided by any suitable process.

The cushioning structure may advantageously be a mattress, a topper or overlay for a mattress, a cushion to support individual body parts, in particular heels, elbows, shoulders or head, in both lying and sitting positions, a seating cushion, such as for example a seating in automotive applications, a seating in aviation applications, a seating in wheel chairs, a seating in office chairs or a seating in furniture, a protective body cushion, such as for example a shinguard, a kneepad or a helmet, or a shockpad in sport fields, in particular artificial turf sport fields.

The following figures and descriptions of the figures are illustrative examples and should not be understood as limiting features of the present invention.

Figure 1:
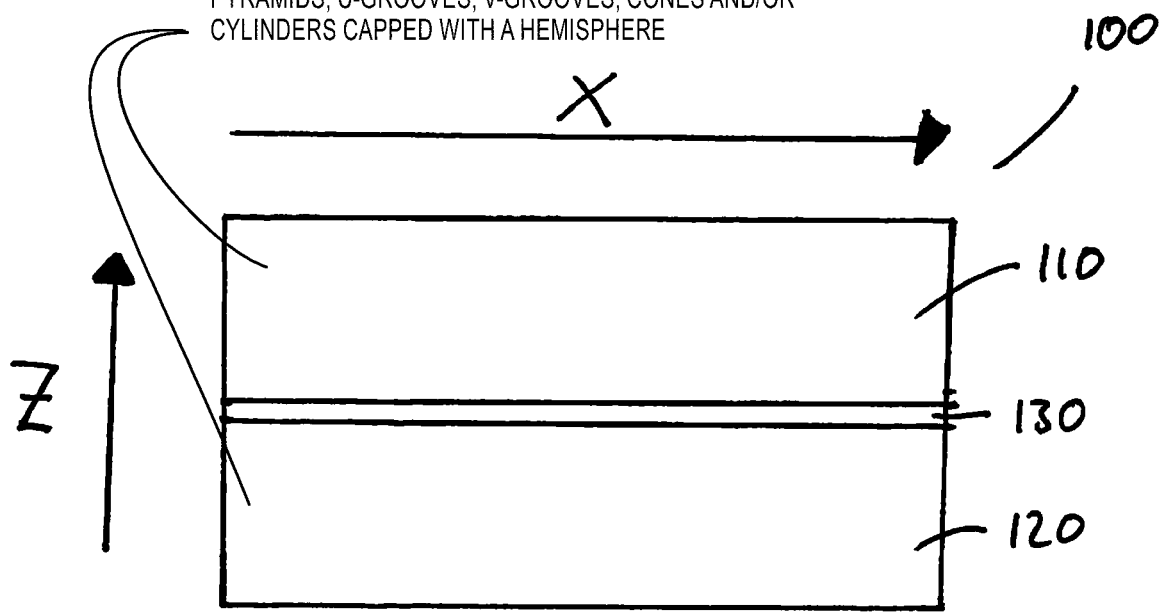
FIG. 1 show a cross sectional view of the cushioning structure.

FIG. 1 shows a cross sectional view of the cushioning structure 100 comprising the first layer and second layer 110 and 120 and the intermediate layer 130.

Figure 2:
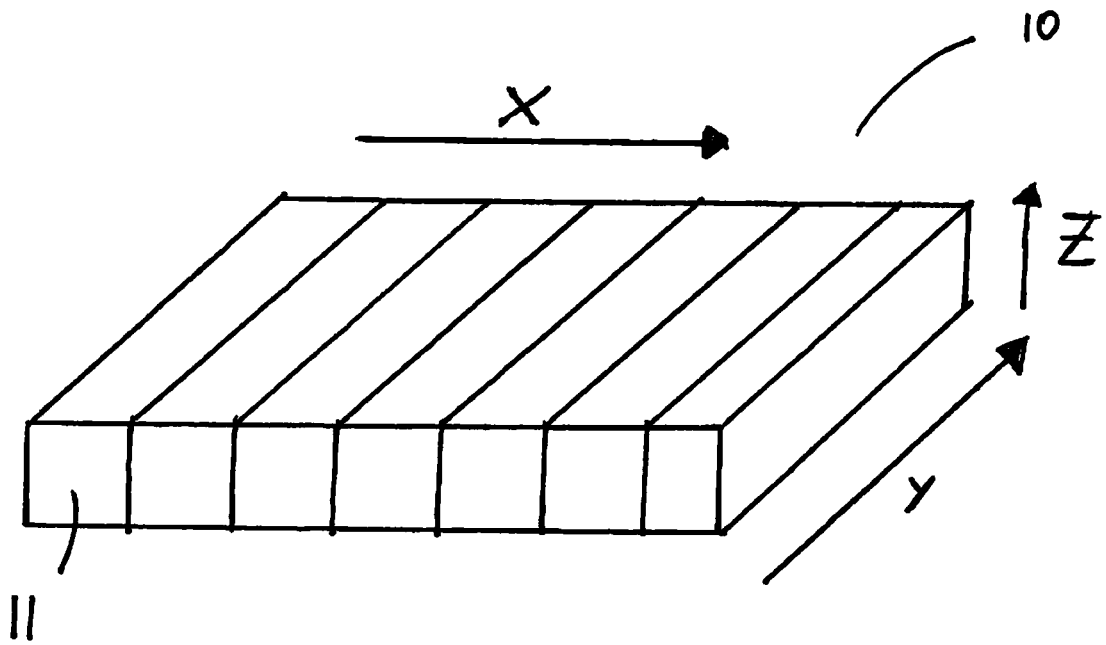
FIG. 2 shows a perspective view of a layer with one or more zones in X-direction (X-zoning).

FIG. 2 shows a perspective view of a layer of the cushioning structure 10 containing one or more zones 11 in X-direction arrow X.

Figure 3:
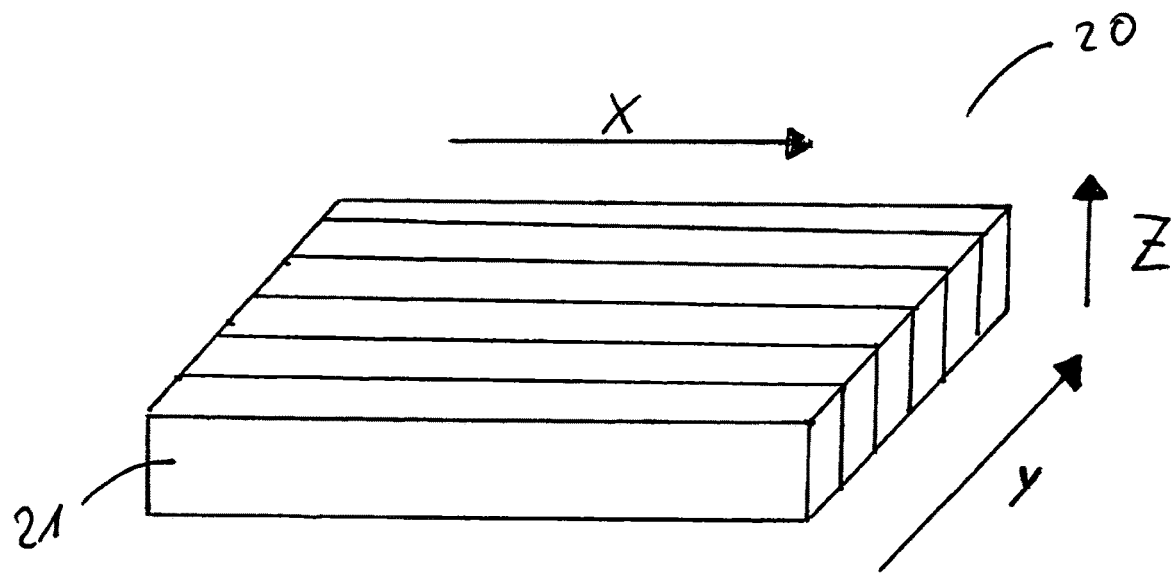
FIG. 3 shows a perspective view of a layer with one or more zones in Y-direction (Y-zoning).

FIG. 3 shows a perspective view of a layer of the cushioning structure 20 containing one or more zones 21 in Y-direction arrow Y.

Figure 4:
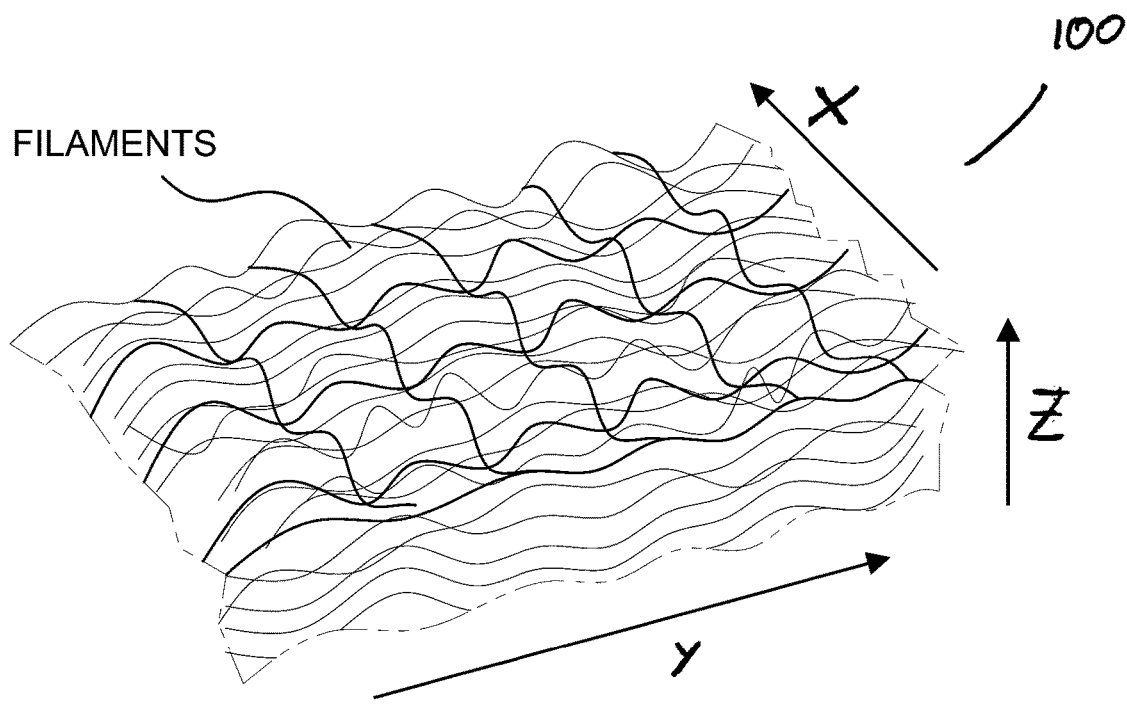
FIG. 4 shows a perspective view of entangled fibers.

FIG. 4 shows a perspective view of entangled fibers.

The invention claimed is:
1. A cushioning structure comprising
a first layer of a three-dimensional structured mat of extruded entangled filaments,
a second layer of a three-dimensional structured mat of extruded entangled filaments and
an intermediate layer between the first layer and the second layer, wherein
at least one of the first layer and the second layer is created by extruding polymeric filaments and collecting the polymeric filaments on a three-dimensional profiled surface, which results in the filaments bending, entangling and coming into contact with each other to form a three-dimensional structure conforming to the three-dimensional profiled surface, and
the three-dimensional structure comprises hills and valleys, hemispheres, positive and/or negative cuspates, cups and/or waffles, pyramids, U-grooves, V-grooves, cones and/or cylinders capped with a hemisphere.
2. The cushioning structure according to claim 1, wherein the first layer and/or the second layer comprise one or more first zones in X-direction.
3. The cushioning structure according to claim 1, wherein the first layer and/or the second layer comprise one or more first zones in Y-direction and/or in Z-direction.

4. The cushioning structure according to claim 2, wherein the one or more first zones of the first layer and/or second layer have a residual thickness of at least 70% of the initial thickness after 1000 repeated compression cycles and a residual indentation hardness at 25% compression of at least 70% of the initial indentation hardness after 1000 repeated compression cycles and an air permeability of at least 10 l/(m².s) at 200 Pa and a pneumatic gradient of 0.5.

5. The cushioning structure according to claim 1, wherein the intermediate layer has an air permeability of at least 10 l/(m².s) at 200 Pa and a pneumatic gradient of 0.5.

6. The cushioning structure according to claim 1, wherein the first layer, the second layer and the intermediate layer have a pressure redistribution capability.

7. The cushioning structure according to claim 2, wherein the one or more first zones of the first layer and/or second layer have an initial modulus less than 50 kPa, and one or more second zones having an initial modulus which is higher than the initial modulus of the one or more first zones.

8. The cushioning structure according to claim 2, wherein the one or more first zones of the first layer and/or second layer comprise the three-dimensional profiled structure.

9. The cushioning structure according to claim 8, wherein the one or more first zones comprise extruded filaments shaped into different three-dimensional forms, wherein the three-dimensional forms comprise different heights.

10. The cushioning structure according to claim 1, wherein the filaments are thermally bonded or interpenetrated melt-bonded at crossing points.

11. The cushioning structure according to claim 1, wherein the first layer and/or the second layer and/or the intermediate layer comprise a thermoplastic elastomeric polymer.

12. The cushioning structure according to claim 11, wherein the first layer and/or the second layer and/or the intermediate layer comprises at least 50 wt. % of a polymer.

13. The cushioning structure according to claim 1, wherein the cushioning structure comprises one or more further layers which are selected from the group consisting of a V-lapped nonwoven layer, a three-dimensional woven fabric, a three-dimensional knitted fabric, a three-dimensional random mat of entangled filaments, a three-dimensional structured mat of extruded filaments, a 3D-printed material and/or a honeycomb structure.

14. The cushioning structure according to claim 1, wherein the first layer and/or the second layer and/or the intermediate layer are thermally, chemically or mechanically bonded together.

15. The cushioning structure according to claim 1, wherein the intermediate layer is selected from the group consisting of a woven, a meltblown nonwoven, a carded nonwoven, an air laid nonwoven, a wet laid nonwoven, a knitted fabric, a net, a scrim and a two-dimensional mat of extruded entangled filaments.

16. The cushioning structure according to claim 1, wherein the cushioning structure is a mattress, a topper or overlay for a mattress, a cushion to support individual body parts in both lying and sitting positions, a seating cushion, a protective body cushion, or a shockpad in sport fields.

17. The cushioning structure according to claim 1, wherein the extrusion of the polymeric filaments creates a layer that is air permeable.

18. The cushioning structure according to claim 17, wherein the layer is air permeable when in contact with a person.

* * * * *